(12) United States Patent
Ogale (10) Patent No.: US 9,053,555 B1
(45) Date of Patent: Jun. 9, 2015

(54) CREATING A MESH FROM A SPARSE STRUCTURE-FROM-MOTION POINT CLOUD USING CO-VISIBILITY OF POINTS

(75) Inventor: Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 389 days.

(21) Appl. No.: 13/478,652

(22) Filed: May 23, 2012

(51) Int. Cl.
*G06T 17/20* (2006.01)
*G06T 7/20* (2006.01)
*G06T 17/00* (2006.01)
*G06T 17/10* (2006.01)
*G06T 17/05* (2011.01)
*G06T 19/20* (2011.01)
*G06T 7/00* (2006.01)

(52) U.S. Cl.
CPC . *G06T 7/20* (2013.01); *G06T 17/00* (2013.01); *G06T 17/10* (2013.01); *G06T 7/0071* (2013.01); *G06T 17/05* (2013.01); *G06T 19/20* (2013.01); *G06T 7/0046* (2013.01)

(58) Field of Classification Search
CPC .......... G06T 17/20; G06T 19/00; G06T 17/00
See application file for complete search history.

(56) References Cited

U.S. PATENT DOCUMENTS

2009/0052796 A1* 2/2009 Furukawa et al. ............ 382/260
2011/0187716 A1* 8/2011 Chen et al. .................... 345/427
2011/0225538 A1* 9/2011 Oyagi et al. ................... 715/781

OTHER PUBLICATIONS

Pollefeys, Marc, et al. "Detailed real-time urban 3d reconstruction from video." International Journal of Computer Vision 78.2-3 (2008): 143-167. (http://link.springer.com/article/10.1007/s11263-007-0086-4).*
Snavely, et al, "Modeling the World from Internet Photo Collections", International Journal of Computer Vision, vol. 80, Issue 2, Nov. 2008, pp. 189-210.

* cited by examiner

*Primary Examiner* — Mark Zimmerman
*Assistant Examiner* — Sarah Le
(74) *Attorney, Agent, or Firm* — Lerner, David, Littenberg, Krumholz & Mentlik, LLP (57) ABSTRACT

A method for creating a three-dimensional mesh model of a structure includes accessing a set of three-dimensional points associated with a set of images of the structure. For each three-dimensional point in the set of three-dimensional points, the method determines a reference image, identifies a subset of images from the set of images of the structure taken within a distance from the reference image, determines a subset of three-dimensional points seen by the subset of images, filters the subset of three-dimensional points to retain only a set of co-visible points that lie in a visibility cone of the reference image, and selects a normal using the set of co-visible points. The three-dimensional mesh model of the structure is computed using the selected normal, and the model may be provided to a second computing device.

19 Claims, 11 Drawing Sheets

CREATING A MESH FROM A SPARSE STRUCTURE-FROM-MOTION POINT CLOUD USING CO-VISIBILITY OF POINTS

FIELD

This application is directed to image model generation, and more specifically, to generating three-dimensional mesh models of structures.

BACKGROUND

Three-dimensional models of structures, such as famous landmarks, may be of interest to people all over the world, for use in navigation, education, and research. Current systems may create a three-dimensional point cloud model of a given entity via "structure-from-motion (SFM)" or "bundle adjustment" using multiple photos of the entity.

Current systems may require that a normal be associated with each of the points to fit a mesh to a point cloud. Often, these normals are recovered by fitting a plane to a point and its nearest neighbors. Yet, a given entity such as the Arc de Triomphe in Paris may have a complex geometry, and the nearest neighbors of a point may not belong to the same surface, which results in incorrect normals being fitted and leads to large errors in mesh creation. There is also a directional ambiguity in the fitted normal, because two solutions that point in opposite directions may both satisfy the same set of points. Accordingly, a need exists for systems, methods, and apparatus to address the shortfalls of present technology and to provide other new and innovative features.

SUMMARY

According to one general aspect, a method for creating a three-dimensional mesh model of a structure may include accessing a set of three-dimensional points associated with a set of images of the structure. For each three-dimensional point in the set of three-dimensional points, the method may determine a reference image, identifies a subset of images from the set of images of the structure taken within a distance from the reference image, determine a subset of three-dimensional points seen by the subset of images, filter the subset of three-dimensional points to retain only a set of co-visible points that lie in a visibility cone of the reference image, and select a normal using the set of co-visible points. The three-dimensional mesh model of the structure may be computed (for example, by a processor of a computing device) using the selected normal, and the model may be provided to a second computing device.

According to another general aspect, a non-transitory computer readable medium may include instructions for creating a three-dimensional mesh model of a structure via a computing device. The instructions may include accessing a set of three-dimensional points associated with a set of images of the structure. The instructions may include for each three-dimensional point in the set of three-dimensional points: determining, using a processor of the computing device, a reference image; identifying, using the processor, a subset of images from the set of images of the structure, the subset taken within a distance from the reference image; determining, using the processor, a subset of three-dimensional points seen by the subset of images; filtering, using the processor, the subset of three-dimensional points to retain only a set of co-visible points that lie in a visibility cone of the reference image; and selecting, using the processor, a normal using the set of co-visible points. The processor may compute the three-dimensional mesh model of the structure using the selected normal. The three-dimensional mesh model may be provided to a second computing device.

According to yet another general aspect, a system for creating a three-dimensional mesh model of a structure may include a memory and a processor operably coupled to the memory and configured to execute code to access a set of three-dimensional points associated with a set of images of the structure. For each three-dimensional point in the set of three-dimensional points, the system may determine a reference image; identify a subset of images from the set of images of the structure, the subset taken within a distance from the reference image; determine a subset of three-dimensional points seen by the subset of images; filter the subset of three-dimensional points to retain only a set of co-visible points that lie in a visibility cone of the reference image; and select a normal using the set of co-visible points. The system may compute the three-dimensional mesh model of the structure using the selected normal, and provide the three-dimensional mesh model to a computing device.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Systems and methods described here use extra co-visibility information, such as which camera captured which point in a given entity, which may be determined from a structure-from-motion (SFM) process. Using this extra co-visibility information improves the mesh quality over other methods, which only use the points. Further, systems and methods described here reduce the size of models (e.g., from megabytes for point models, to kilobytes for mesh models) and thereby reduce the time to serve the models to users, for example in a web browser. Additionally, the creation of the mesh models described here enable navigation of famous structures, for example using a web browser.

For each three-dimensional point within different photographs or images of the same surface, the system determines a reference photo for the three-dimensional point. The system identifies a subset of photographs taken within a predetermined distance from the reference photo. The system determines a set of three-dimensional points seen by the subset of photographs, and filters the set of three-dimensional points to retain only a set of co-visible points that lie in a visibility cone of the reference photo. The system uses the set of co-visible points to create two possible solutions for a surface normal (which is defined herein to include a vector that points perpendicular to a given line or surface). The system creates a plane which passes through as many points as possible, giving two opposite surface normals. The system selects a normal from the two possible solutions (e.g., the two opposite solutions) by selecting the normal that points toward a camera center of the reference photo. For each point, the system computes a normal using the visibility information. Once all normal are computed for the points, the system computes the three-dimensional mesh model of the structure using a surface fitting algorithm, such as a Poisson reconstruction algorithm, a marching cubes algorithm, or another three-dimensional surface construction algorithm.

Figure 1:
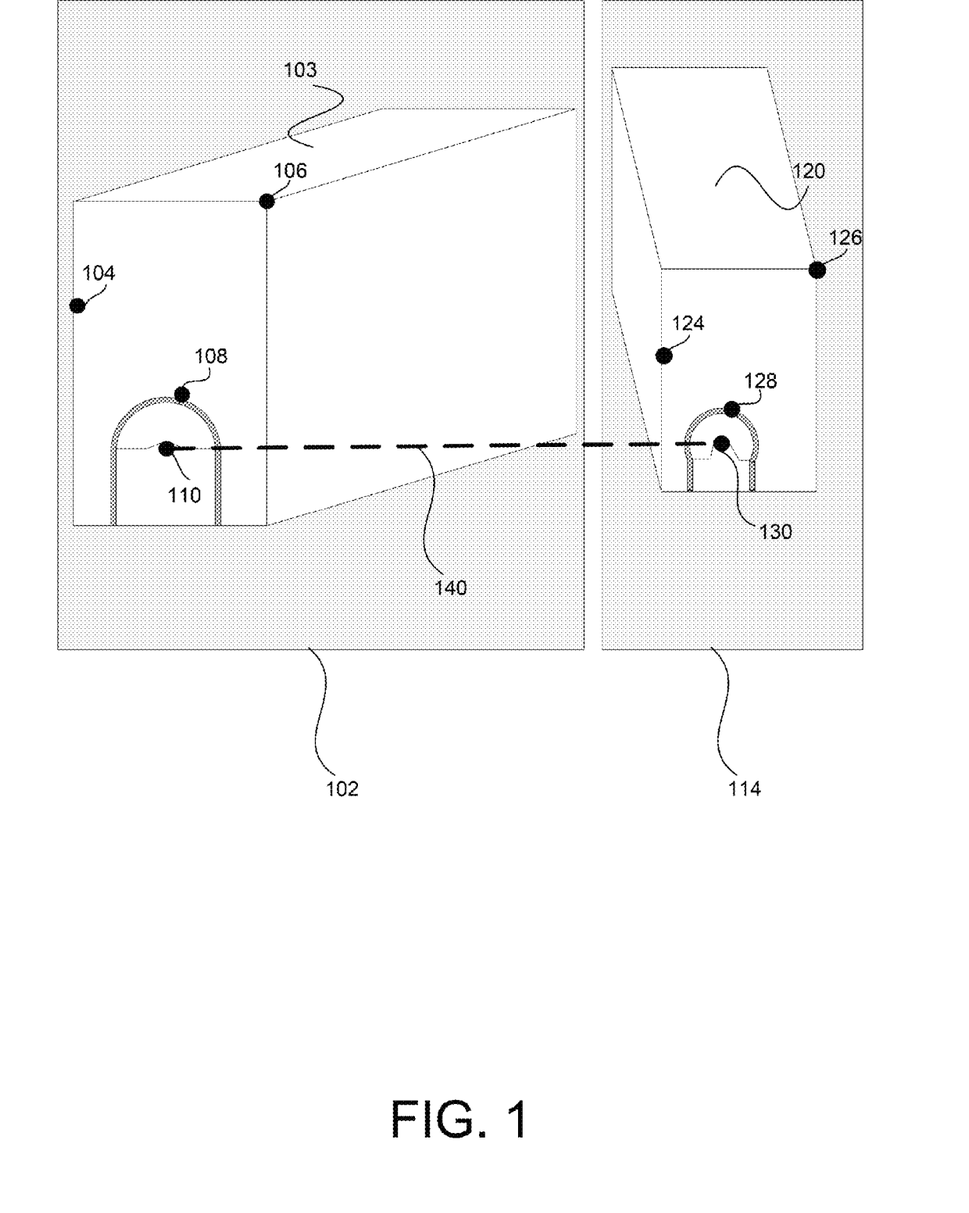
FIG. 1 is a block diagram of images of a structure that can be used to implement the techniques described here.

FIG. 1 is a block diagram of images of a structure that can be used to implement the techniques described here.

Images 102 and 114 may be photographs of the same structure (represented by blocks 103 and 120) taken from different angles. The photographs may be public user photos (e.g., from Picasa, Flickr, Panoramio) or other images or images stores, and may be stored in various data stores across a network or in a single data store in a computing device, as described in more detail below with respect to FIGS. 2 and 5.

The structure may be a landmark, building, or other configuration of physical elements. In some implementations, the object represented by the images 102 and 114 can be a real-world object, such as a running shoe. In other words, the three-dimensional structure 103 can represent a real-world object, or can be a virtual representation of the object. In some embodiments, the object can be a building, a statue, a monument, a feature in nature (e.g., a mountain, a cliff, a lake), and so forth. In some embodiments, the object can be a famous landmark such as the Eiffel Tower, the Arc de Triomphe, a pyramid in Giza, Egypt, the Taj Mahal, Mt. Fuji in Japan, and so forth.

Structure 103 includes various three-dimensional points, examples of which include 104, 106, 108, and 110. Similarly, structure 120 includes various three-dimensional points, examples of which include 124, 126, 128, and 130.

As shown in FIG. 1, two images 102 and 114 may be photographs or other images of the same structure taken from different angles or vantage points. For example, structure 103 shown in image 102 is the same as structure 120 shown in image 114, from a different angle. Both images 102 and 114 may include various points on the structure. The structure may have a complex geometry, and the nearest neighbors of a point may not belong to the same surface. For example, structure 103 includes points 104, 106, 108, and 110. Yet, points 108 and 110, while neighbors, may not belong to the same surface. Similarly, structure 120 includes points 124, 126, 128, and 130. Yet, points 128 and 130, while neighbors, may not belong to the same surface.

When correlated, for example by matching features in image pairs such as images 102 and 114, points 110 and 130 may be used to create tracks (as shown by dashed line 140) to establish the same point seen in multiple images.

In some implementations, the images 102 and 114 can represent a portion of a real-world such as, for example, a portion of land within a specific country on the earth. The images can include a space defined for referencing locations of, for example, objects (e.g., representations of real-world object), or portions thereof. In some embodiments, the coordinates within the real-world space can be, or can include, coordinates that can be used to reference any location on the earth (e.g., global positioning coordinates) or another planet. At least some portions of the images can be referenced to a ground surface.

In some embodiments, a three-dimensional mesh model created using images 102 and 114 can be created so that the three-dimensional mesh model of the structures can be used (e.g., viewed, interacted with) within a real-world space, such as a virtual geographical map (e.g., global or earth map) that can be navigated using a computer system (e.g., a personal computer). In such embodiments, a three-dimensional mesh model of an object such as building can be viewed by a user within the virtual map. The placement processing of the three-dimensional mesh model of the object can be performed automatically after the three-dimensional model of the object has been produced with little or no manual intervention by an entity producing the three-dimensional mesh model of the object.

In some embodiments, the three-dimensional mesh model of the object can be produced using multiple images of the object captured using multiple different image capture devices. Points (e.g., features) within the multiple images can be matched and used to generate the three-dimensional mesh model. In some embodiments, one or more of the multiple images can be publicly available images (e.g., publicly available images posted to one or more websites or stored in one or more repositories). In some embodiments, the multiple images can be captured during different time periods. In some embodiments, images used to produce a three-dimensional mesh model can be selected (e.g., filtered) based on size, field of view, user identification associated with the images, and/or so forth. In some embodiments, one or more images can be excluded from processing to produce the three-dimensional mesh model based on a user preference associated with the image(s). A process for creation of the three-dimensional mesh model, for example using images 102 and 114, is described in more detail below with respect to FIGS. 2-10.

Figure 2:
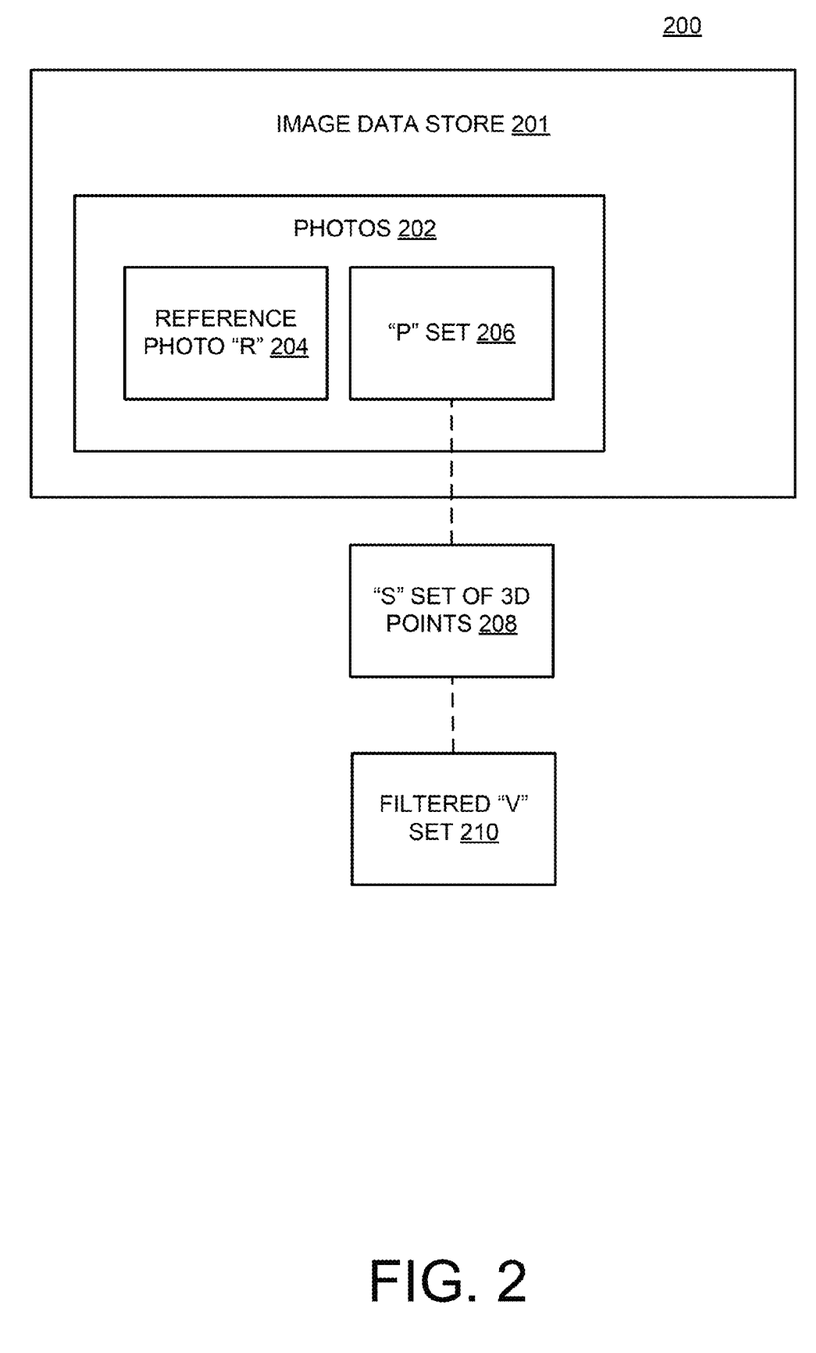
FIG. 2 is a block diagram of a data set that can be used to implement the techniques described here.

FIG. 2 is a block diagram of a data set that can be used to implement the techniques described here. As shown in FIG. 2, system 200 may include an image data store 201. Image data store 201 may be any type of database, storage device, server, or other electronic device to store photographs, models, laser-scans, and other images. Image data store 201 may include photos 202. Photos 202 may include a reference photo "R" 204. Although not shown, in some implementations, the image data store 201 can also include date time stamps, resolution information, image capture device types, location information such as coordinates, user identification information, and other data that can be associated with one or more of the images.

The system 200 may find a set of photographs "P" 206, from photos 202 that were taken within a vicinity of the reference photo "R" 204. The vicinity may be a predetermined radius, such as 50 meters, for example. System 200 may determine a set of three-dimensional points "S" 208, which include some or all of the three-dimensional points seen by the set of photos "P" 206. For example, referring back to FIG. 1, the set of three-dimensional points "S" 208 may include points 104, 106, 108, 110, 124, 126, 128, and 130. Turning back to FIG. 2, system 200 may filter the points in the set of three-dimensional points "S" 208 to keep only points which lie in the visibility cone of the reference photo "R" 204. This is the filtered "V" set 210 of points which are co-visible with an input point(s) (where an input point may be any point from the model). System 200 may then fit a plane, for example using Random Sample Consensus (RANSAC), which is an iterative method to estimate parameters of a mathematical model from a set of data that includes outliers, to the filtered set "V" 210 of co-visible points. The plane may provide two possible solutions for the surface normal, which are mutually opposite. Out of the two solutions, the normal may be selected that points toward to camera center of the reference photo "R" 204, as described in more detail below with respect to FIG. 3A, so that the surface is visible.

For each point, system 200 may compute a normal using the visibility information. Once the system has computed normals for all of the points for the set of three-dimensional points "S" 208, a surface fitting algorithm, such as a Poisson reconstruction algorithm, may be employed to compute a mesh model of the structure using the normals for all of the points.

Figure 3A:
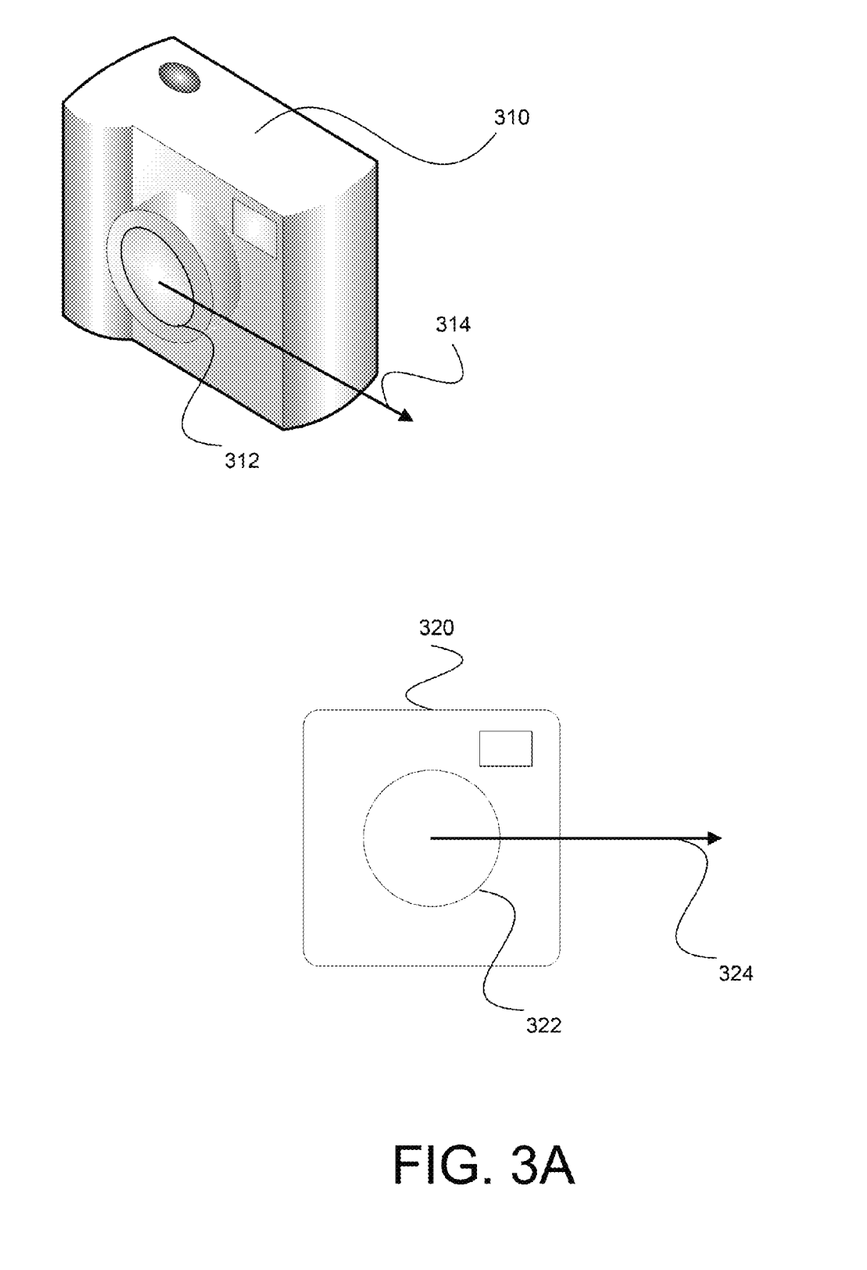
FIG. 3A is a block diagram of examples of image capture devices configured in different orientations.

FIG. 3A is a block diagram of examples of image capture devices with different orientations. As shown in FIG. 3A, image capture devices 310 and 320 may have different orientations. Image capture devices 310 and 320 are merely for illustration, and any number and variation of image capture devices types and orientations may be used. Image capture device 310 includes lens 312, which points toward an x-axis direction illustrated by arrow 314. Image capture device 320 includes lens 322, which points toward an x-axis direction illustrated by arrow 324. The orientation of lens 312 or lens 322 may be computed using techniques such as structure-from-motion or bundle adjustment, for example. The orientation of the image capture devices can be calculated based on characteristics of the multiple images used to produce the three-dimensional model of the object including pose represented by translation and/or orientation, distortion (e.g., radial lens distortion), focal length, and/or so forth.

As other examples, any number of image capture devices (e.g., more than 100 cameras) may have captured images of the same point on a single structure (e.g., point 108 shown in FIG. 1) from a number of different angles. The system may identify which image capture device sees which point and may also identify the orientation of each camera to aid in construction of the mesh model, for example as described above with respect to FIG. 2.

Figure 3B:
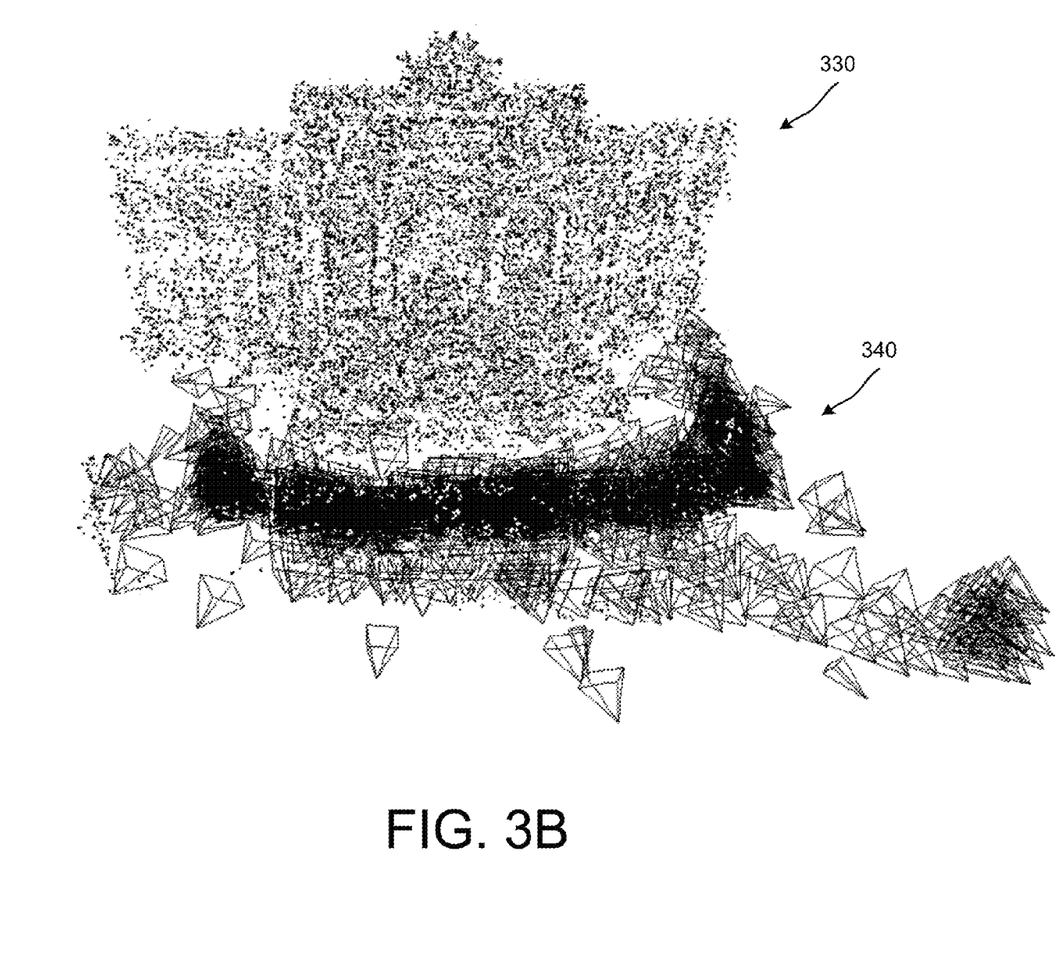
FIG. 3B is a diagram that illustrates a three-dimensional model of a building produced using multiple images captured by multiple image capture devices at locations illustrated by image capture device orientation indicators.

FIG. 3B is a diagram that illustrates a three-dimensional model 330 of a building produced using multiple images captured by multiple image capture devices (e.g., devices 310 and 320, or other cameras) at locations illustrated by image capture device orientation indicators 340 (represented by pyramids in this implementation). Specifically, features included in the multiple images are processed (e.g., matched) and used to produce the three-dimensional model 330 of the building. The shape of the three-dimensional model 330 of the building is represented by model datapoints, which are shown as dots.

During modeling of the three-dimensional model 330 of the building, the locations of the image capture devices are calculated (e.g., modeled, estimated), and the locations may, in some implementations, be represented by indicators, such as orientation indicators 340 shown in FIG. 3B. In other implementations, the locations may not be expressly rendered or shown. Because the orientations of the image capture devices can be calculated during modeling, the image capture device orientation indicators 340 (which can include up-direction indicators, planar indicators, etc.) can be referred to as model orientation indicators 340. The model orientation indicators 340 of the image capture devices can be calculated based on characteristics of the multiple images used to produce the three-dimensional model 330 of the building including, pose represented by translation and/or orientation, distortion (e.g., radial lens distortion), focal length, and/or so forth.

Figure 4:
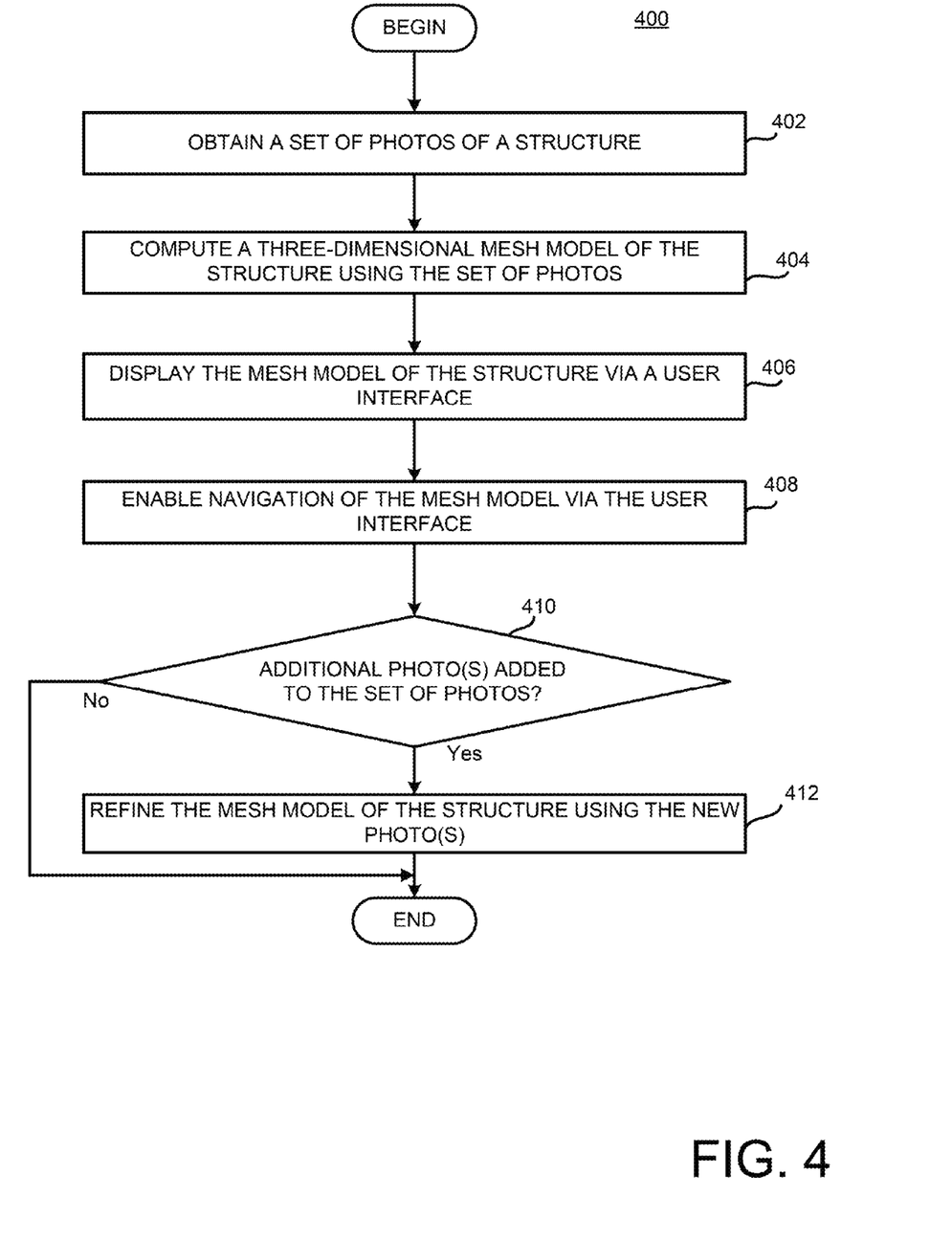
FIG. 4 is a flow diagram of a process that can be used to create and refine a three-dimensional mesh model of a structure.

FIG. 4 is a flow diagram of a process that can be used to create and refine a three-dimensional mesh model of a structure. As shown in FIG. 4, process 400 includes obtaining a set of photos of a structure (402). The set of photos may be obtained by members of the public, and may be submitted (e.g., via the Internet) to a central data store, publicly accessible photography website, or other image database such as image data store 201 shown in FIG. 2.

To obtain a set of photos of the structure, all imagery within a radius around a landmark may be selected from a set of imagery. As another example, known images may be used to find popular keywords associated with the landmark. A keyword model may be created and used to rank and select more imagery from a larger corpus. In some implementations, "bad" imagery may be filtered, for example by removing certain types of images, such as: spam images (e.g., too many images from the same user), images lacking Exchangeable Image File (EXIF) data, cropped images, images which are smaller than a certain size, or images with a field of view that is larger than a certain size.

The process includes computing a three-dimensional mesh model of the structure using the set of photos (404), as described in more detail below with respect to FIG. 5. The process includes displaying the mesh model of the structure via a user interface (406). The process enables navigation of the mesh model via the user interface (408). For example, a user may click on various portions of the mesh model to zoom in on the model, rotate the model to view alternative angles, or take a virtual tour of the exterior of a structure, for example. As any additional photos are added to the set of photos (410, yes), for example when users upload new photos of the structure, the process 400 may refine the mesh model of the structure using at least one of the new photo(s) (412). If no additional photos are added to the set of photos (410, no), the process 400 may end. One skilled in the art will recognize that process 400 may have steps added, rearranged, or deleted. For example, steps 410 and 412 may be deleted.

Figure 5:
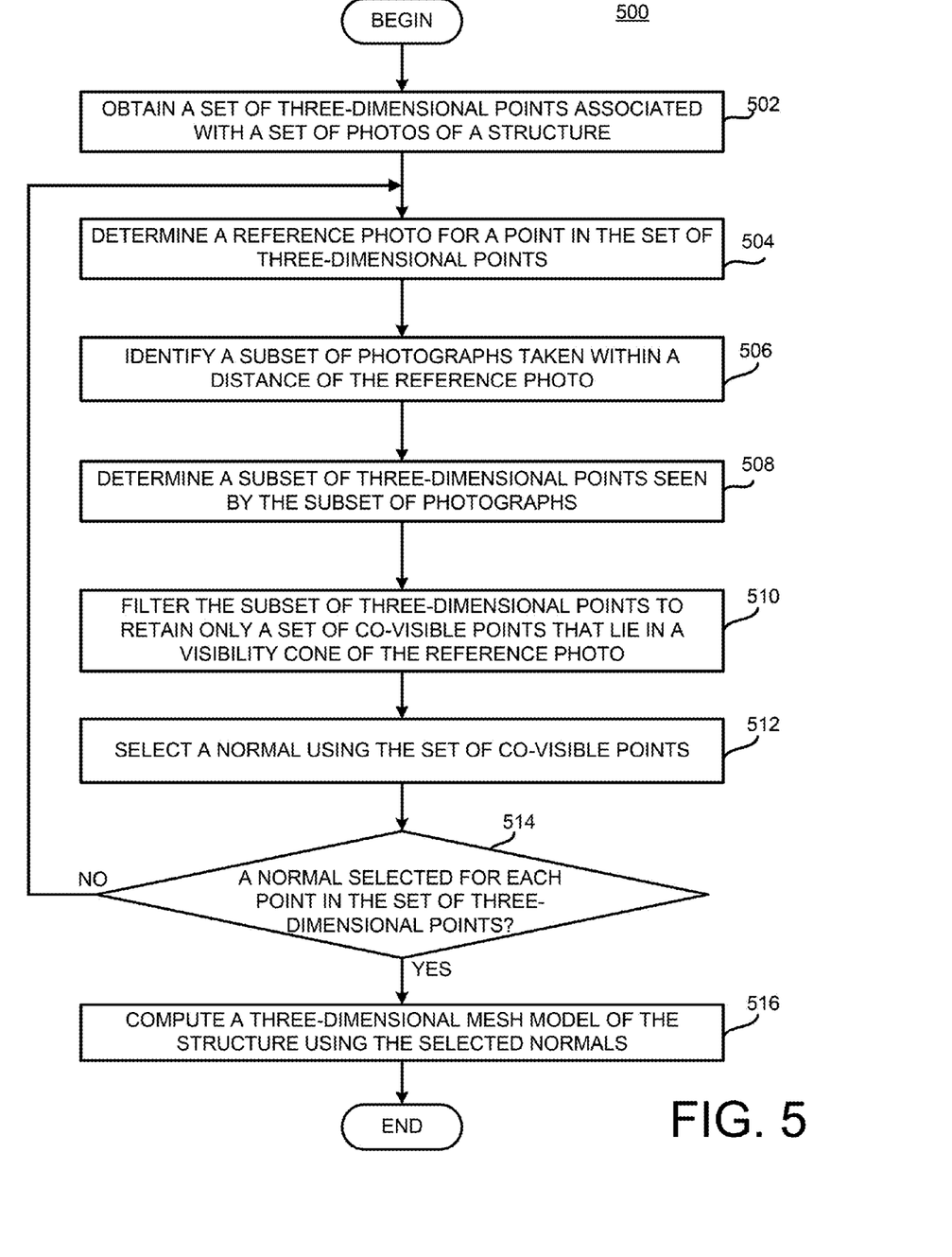
FIG. 5 is a flow diagram of an exemplary process to compute a three-dimensional mesh model of a structure.

FIG. 5 is a flow diagram of an exemplary process to compute a three-dimensional mesh model of a structure. Process 500 may obtain a set of three-dimensional points associated with a set of photos of a structure (502). A reference photo for a point in the set of three-dimensional points may be determined (504). The reference photo for the point may be determined in any number of ways. For example, the reference photo may be automatically selected arbitrarily from among a set of photos, or may be chosen by an operator.

A subset of photographs taken within a distance of the reference photo is identified (506). The distance may be a predetermined distance (e.g., a radius of 20 meters), or the distance may be based on some other factor, such as a homography distance test. A subset of three-dimensional points seen by a subset of the photographs is determined (508). The subset of three-dimensional points is filtered to retain only a set of co-visible points that lie in a visibility cone of the reference photo (510). A normal is selected using the set of co-visible points (512). Once a normal is selected for each point in the set of three-dimensional points (514, yes), a computation is made of a three-dimensional mesh model of the structure, using the selected normal (516). If a normal is not selected for each point in the set of three-dimensional points (514, no), the process returns to block 504. One skilled in the art will recognize that process 500 may have steps added, rearranged, or deleted.

Figure 6:
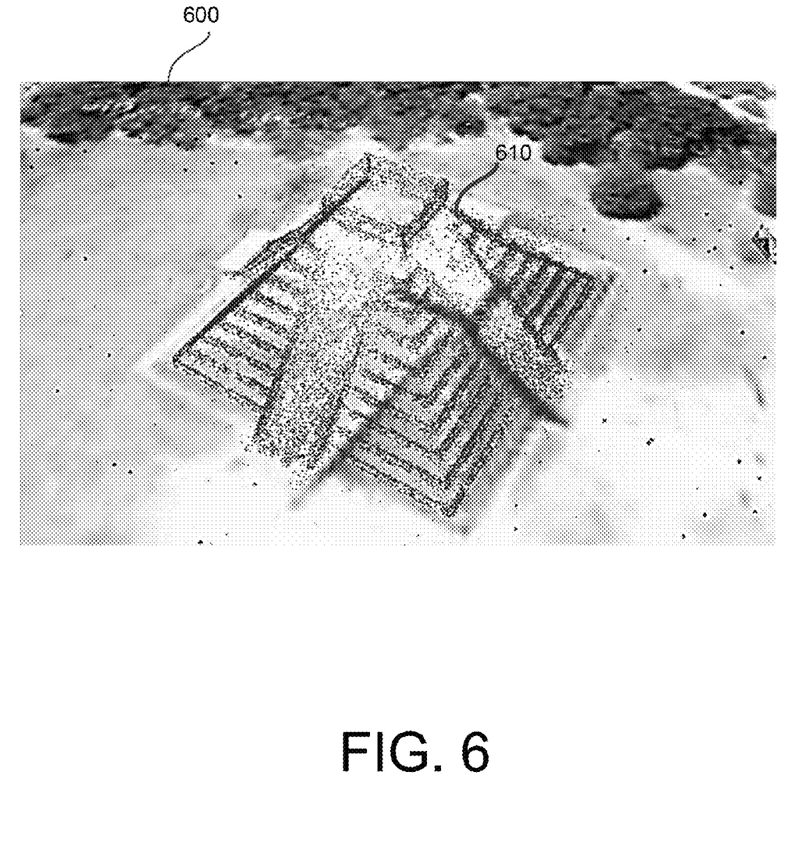
FIG. 6 is an example of a sparse point close image on top of a satellite image.

FIG. 6 is an example of a sparse point cloud image on top of a satellite image. FIG. 6 includes satellite image 600 which may be a satellite image of an area including structure 610, represented by dotted lines. The satellite image may be stored in a central database, such as a database described below with respect to FIG. 10. Structure 610 may be any type of building, landmark, entity, etc. Although the satellite image 600 is shown in FIG. 6, in various implementations, aerial imagery (including but not limited to oblique images) or a combination of satellite and aerial images may be used.

Figure 7:
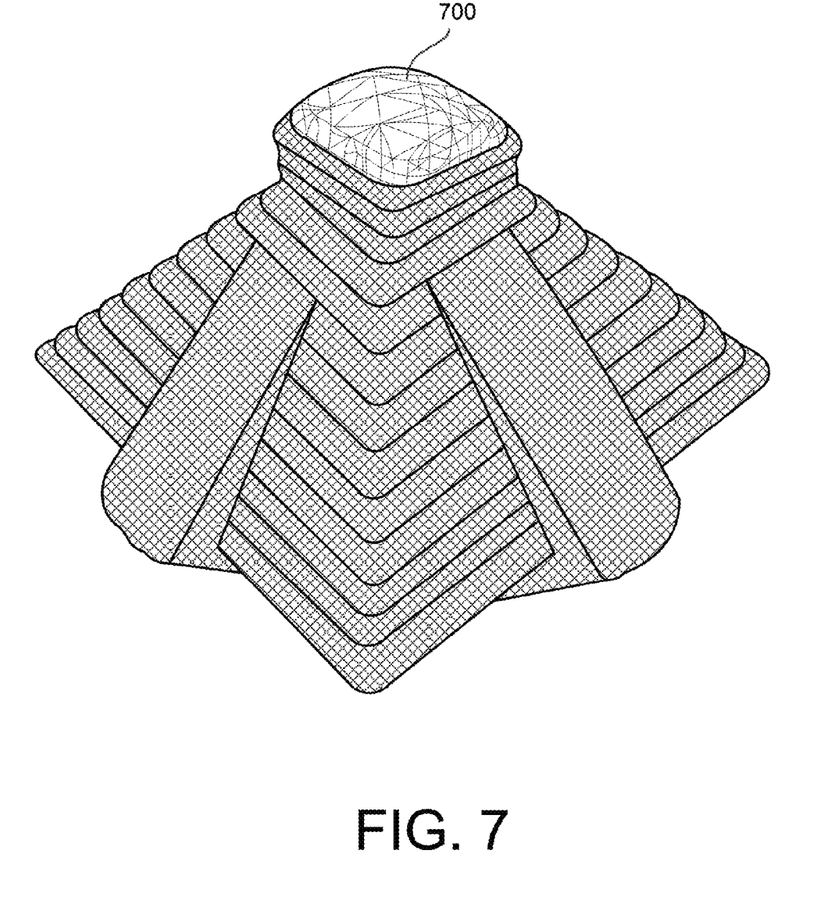
FIG. 7 is an example sparse mesh model that may be obtained using techniques described here.

FIG. 7 is an example sparse mesh model that may be obtained using techniques described here. FIG. 7 includes sparse mesh model 700 that may be obtained using satellite image 600 shown in FIG. 6, and that may be created using techniques such as those described above with respect to FIGS. 1-5.

Figure 8:
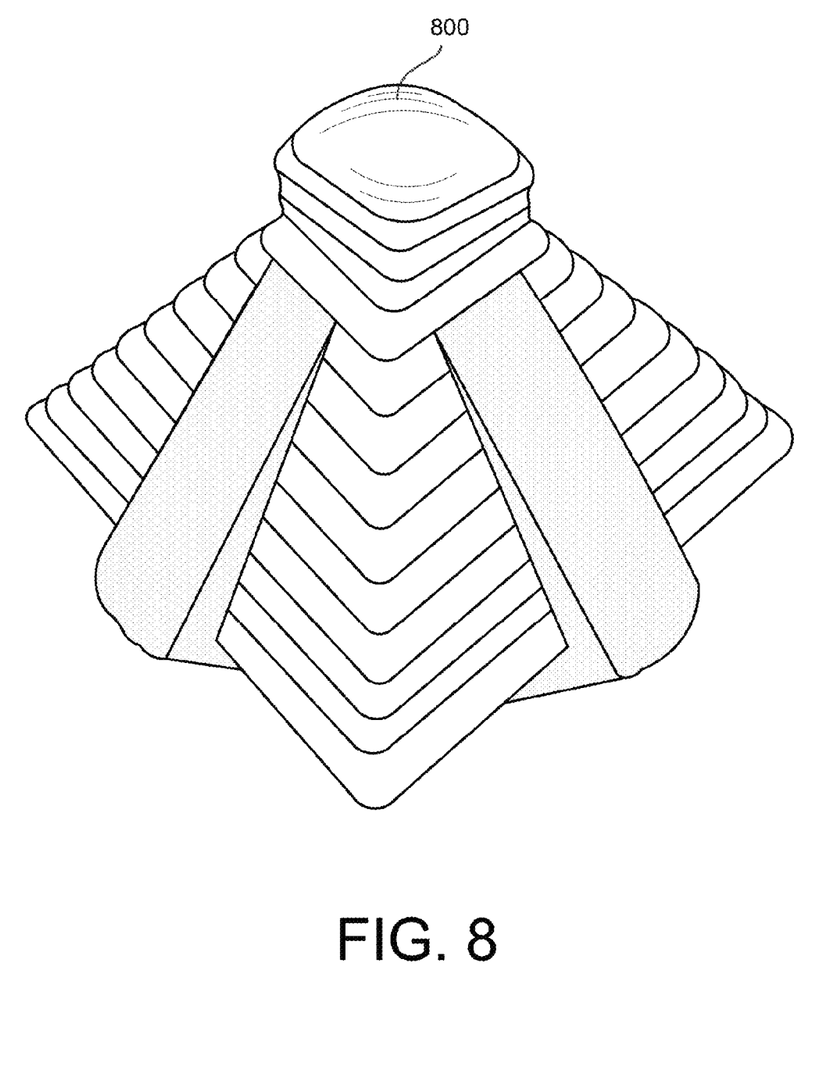
FIG. 8 is an example version of a visualization of the sparse mesh model shown in FIG. 7.

FIG. 8 is an example version of a visualization of the sparse mesh model shown in FIG. 7. FIG. 8 includes mesh model 800, which may represent a shaded visualization of the same mesh shown in FIG. 7. The mesh model 800 may be textured, for example based on images of the object. Such a model 800 may be used in geographic mapping web applications, any kind of user interfaces, or other applications, to allow users to view the three-dimensional mesh model on any type of computing device. For example, a georeference process may be used to place the model on a user interface of a map. Various examples of computing devices that may be used to create, refine, and display the mesh model are described in more detail below with respect to FIG. 10.

Figure 9:
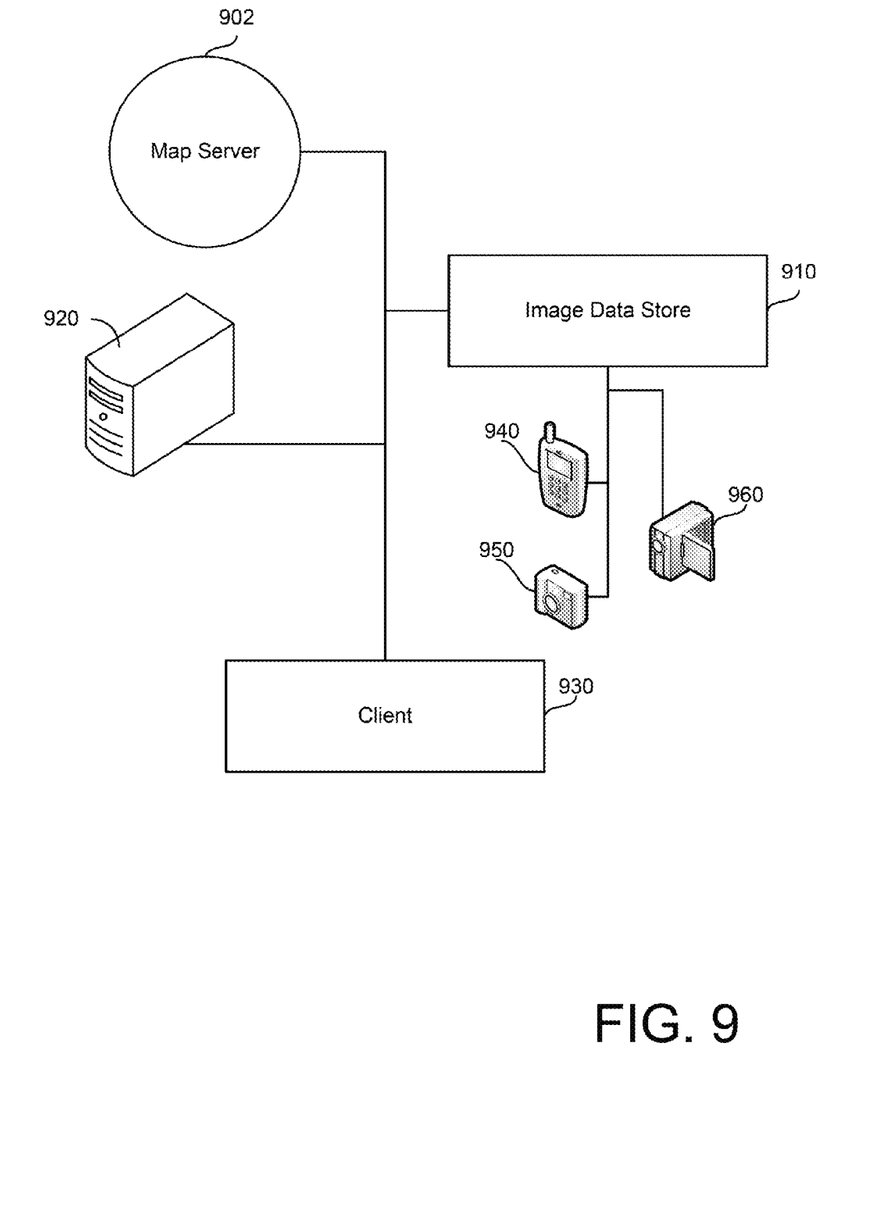
FIG. 9 shows an example of a system that can be used to implement the techniques described in FIGS. 1-8.

FIG. 9 shows an example of a system that can be used to implement the techniques described in FIGS. 1-8. System 900 includes a map server 902, an image data store 910, a central server 920, a client 930, and image capture devices 940, 950, and 960. One skilled in the art will recognize that any number of servers, clients, and/or image capture devices may be configured in system 900, and the illustrated servers, clients, and/or image capture devices are illustrative examples only.

Map server 902, which may represent one or more servers or data stores, may provide data for and calculations to determine geographic routing options or models of structures in a geographic route, based on search queries entered by users into a graphical user interface of a client 930 or of any computing device. Map server 902 may calculate, generate, and refine geographic routes in response to search queries for walking, biking, driving, or public transit directions, for example. Map server 902 may utilize publicly available data and other map data stored in a remote database or server (such as image data store 910) to calculate, generate, and refine the geographic routes and to calculate, generate, and refine mesh models of structures in geographic areas all over the world.

The map server 902 may provide searchable, pannable mapping tools for route planning such as driving, public transit, walking, and biking. Such tools may be executed in JavaScript and XML, as examples. Additionally, map server 902 may generate mesh models of structures in locations all over the world. Map server 902 may be utilized in conjunction with one or more data stores that provide data for street views, satellite views, aerial views, traffic information, weather information, photos, models, business information, and webcam views of various locations. Such data may include images that have been provided in part or in whole by members of the public, for example via a client 930 directly to map server 902 or to image data store 910.

For example, map server 902 may include or communicate with an image data store 910. Image data store 910 may store information, such as photographs, laser-scans, cloud point models, or other images or models of structures, such as the structures depicted in FIGS. 1, 6, 7, and 8. Map server 902 may communicate with image data store 910 to collect images for use in creating sparse mesh models, for example using processes such as those described with respect to FIGS. 4 and 5. Image data store 910 may continually receive and update images, for example from client 930, or from image capture devices 940, 950, and 960. Image capture device 940 may be a smartphone or cell phone. Image capture device 950 may be a digital camera. Image capture device 960 may be a video camera. Any number of image capture devices may communicate directly with image data store 910. In other implementations, image capture devices 940, 950, or 960 may communicate with client 930 or with central server 920. In some implementations, client 930 may be a smartphone or other image capture device that may communicate directly with image data store 910. Images may be transmitted from image capture devices 940, 950, and 960 only with permission from users that have consented to transmit images to image data store 910. In some implementations, image data store 910 may include privacy and permission controls to protect users' private data and images, for example if a user wishes to share only certain images the user has uploaded to image data store 910 with map server 902.

Images may be associated with various geographic locations, entities, structures, or businesses, such as famous landmarks or neighbourhood stores. Other implementations are contemplated. For example, attributes may be retrieved from other local or remote services not depicted in FIG. 9, such as social networks, public image databases, or other services. Image data store 910 may also communicate with other servers to retrieve and update images or image data. As another example, map server 902 and image data store 910 may be combined into a single server, such as central server 920.

Central server 920 may also communicate with map server 902, image data store 910, and client 930, for example via a network such as the Internet. In some implementations, central server 930 may also store information in a database associated with, or accessible via, a user account if users have opted to allow such storage. Such information may include, for example, user profile data, images taken by a user, preferences, geographic location, or other data, with user consent.

Central server 920 may also communicate with one or more clients 930, which may be used by members of the public seeking to search for models of famous landmarks in geographic maps, for example. Such communication may occur via the use of a web application, web browser, native application, or other program.

Figure 10:
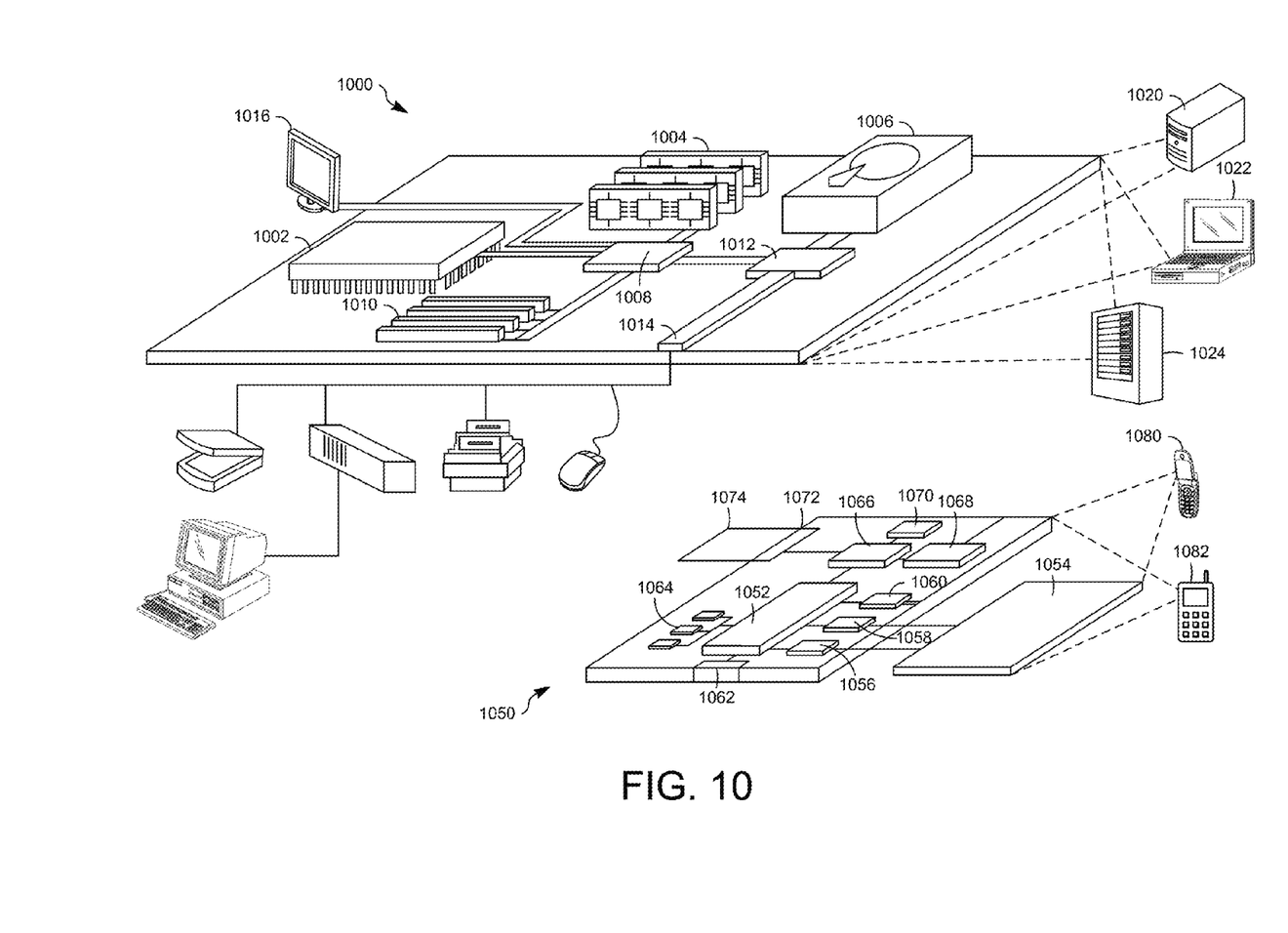
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order. In addition, other steps may be provided, or steps may be eliminated, from the described flows, and other components may be added to, or removed from, the described systems. Accordingly, other implementations are within the scope of the following claims.

What is claimed is:

1. A method for creating a three-dimensional mesh model of a structure, comprising:
   accessing a set of three-dimensional points associated with a set of images of the structure;
   for each three-dimensional point in the set of three-dimensional points:
      determining, using one or more processors of a computing device, a reference image;
      identifying, using the one or more processors, a subset of images from the set of images of the structure, the subset taken within a distance from the reference image;
      determining, using the one or more processors, a subset of three-dimensional points seen by the subset of images;
      filtering, using the one or more processors, the subset of three-dimensional points to retain only a set of co-visible points that lie in a visibility cone of the reference image;
      creating, using the one or more processors, two possible solutions for a surface normal using the set of co-visible points, and
      selecting, using the one or more processors, a normal from the two possible solutions for a surface normal;
   computing, using the one or more processors, the three-dimensional mesh model of the structure using the selected normals; and
   providing the three-dimensional mesh model to a second computing device.

2. The method of claim 1, wherein the selecting the normal includes selecting the normal that points toward a camera center of the reference image.

3. The method of claim 1, wherein each three-dimensional point is obtained by a structure-from-motion process using multiple images of the structure.

4. The method of claim 1, wherein the set of images are stored in a central data store accessible by the computing device.

5. The method of claim 4, wherein at least a portion of the set of images are provided by users of multiple computing devices to the central data store.

6. The method of claim 1, wherein the set of images include photographs and laser scans of the structure.

7. The method of claim 1, wherein determining the reference image includes randomly selecting the reference image from the set of images of the structure.

8. The method of claim 1, wherein determining the reference image includes receiving an identification of the reference image from a user.

9. The method of claim 1, wherein the utilizing includes fitting a plane to the set of co-visible points using random sample consensus.

10. The method of claim 1, wherein the distance is a predetermined radius around the structure.

11. The method of claim 1, wherein the three-dimensional mesh model is computing using Poisson reconstruction.

12. The method of claim 1, further comprising:
determining the distance using a homography distance test.

13. The method of claim 1, further comprising:
displaying the three-dimensional mesh model in a graphical user interface of the second computing device.

14. The method of claim 13, further comprising:
enabling navigation of the three-dimensional mesh model via the graphical user interface of the second computing device.

15. The method of claim 1, further comprising: refining, using the one or more processors, the three-dimensional mesh model after a new image is added to the set of images of the structure.

16. The method of claim 1, further comprising:
providing a graphical user interface including the three-dimensional mesh model; and
enabling a user to edit the three-dimensional mesh model via the graphical user interface.

17. The method of claim 16, wherein the graphical user interface includes a graphical map of an area including the structure.

18. A non-transitory computer readable medium including instructions for creating a three-dimensional mesh model of a structure via a computing device, the instruction comprising:
accessing a set of three-dimensional points associated with a set of images of the structure;
for each three-dimensional point in the set of three-dimensional points:
determining, using one or more processors of the computing device, a reference image;
identifying, using the one or more processors, a subset of images from the set of images of the structure, the subset taken within a distance from the reference image;
determining, using the one or more processors, a subset of three-dimensional points seen by the subset of images;
filtering, using the one or more processors, the subset of three-dimensional points to retain only a set of co-visible points that lie in a visibility cone of the reference image;
creating, using the one or more processors, two possible solutions for a surface normal using the set of co-visible points, and
selecting, using the one or more processors, a normal from the two possible solutions for a surface normal;
computing, using the one or more processors, the three-dimensional mesh model of the structure using the selected normals; and
providing the three-dimensional mesh model to a second computing device.

19. A system for creating a three-dimensional mesh model of a structure, comprising:
a memory; and
one or more processors operably coupled to the memory and configured to execute code to:
access a set of three-dimensional points associated with a set of images of the structure;
for each three-dimensional point in the set of three-dimensional points:
determine a reference image;
identify a subset of images from the set of images of the structure, the subset taken within a distance from the reference image;
determine a subset of three-dimensional points seen by the subset of images;
filter the subset of three-dimensional points to retain only a set of co-visible points that lie in a visibility cone of the reference image;
create two possible solutions for a surface normal using the set of co-visible points, and
select a normal using from the two possible solutions for a surface normal;
compute the three-dimensional mesh model of the structure using the selected normals; and
provide the three-dimensional mesh model to a computing device.

* * * * *